Patented Feb. 3, 1948

2,435,460

UNITED STATES PATENT OFFICE 2,435,460

PROCESS OF PREPARING ALDEHYDIC MATERIAL

Charles I. Parrish, Drexel Hill, Pa., assignor to The Pennsylvania Salt Manufacturing Company, Philadelphia, Pa., a corporation of Pennsylvania No Drawing. Application April 20, 1944, Serial No. 531,985

9 Claims. (Cl. 260—340)

The present invention relates to a process for the treatment of an $\alpha$-alkylene oxide to convert it into a product comprising a para-aldehyde, and more particularly, it relates to a process of treating an $\alpha$-alkylene oxide of from 2 to 5 carbon atoms to convert it into a mixture of the monomeric aldehyde isomer of the alkylene oxide and the para-aldehyde thereof or into the said para-aldehyde.

The isomerization of an alkylene oxide, such as ethylene oxide to acetaldehyde, has long been known, but the methods heretofore available have not been economical in the materials or conditions required. In accordance with one prior method, the conversion is conducted in the vapor phase at temperatures up to 500° C., or when catalysts are present at temperatures as low as 150° C. (Berichte 36; 2016; 1903). The use of various catalysts has been reported and these include inorganic salts, oxides and hydroxides. In another method, involving liquid phase conversion of the alkylene oxide, hot dilute acids have been employed as isomerization catalysts.

The principal object of the present invention is to provide a process for the catalytic conversion of an $\alpha$-alkylene oxide into a product comprising the para-aldehyde of a monomeric aldehyde isomer of said alkylene oxide, which is characterized by economies in materials and in operation as compared to prior methods.

Another object of the invention is to provide a process for the production of a product comprising a para-aldehyde from the $\alpha$-alkylene oxides in which substitution, secondary or other side reactions are avoided.

Other objects will be apparent from a consideration of the specification and claims.

The process of the present invention involves the conversion of an $\alpha$-alkylene oxide into a mixture of the monomeric aldehyde isomer of the alkylene oxide and the para-aldehyde thereof or into the said para-aldehyde, using chlorine as a catalyst. While the mechanism of the conversion of the alkylene oxide is not important from the standpoint of the process and the invention is not to be limited to any particular theory, it is believed that the mechanism of the reaction may involve the re-arrangement of the alkylene oxide into its isomeric aldehyde under the influence of the catalyst—followed by at least partial polymerization of the monomeric aldehyde into the para-aldehyde. The mechanism may be complicated by the fact that, as is known, a monomer aldehyde may exist in equilibrium with its trimer. Since in the process, there is at least a partial polymerization of the monomeric aldehyde to form the para-aldehyde, the product produced comprises the para-aldehyde.

The process is applicable for the conversion of any of the $\alpha$-alkylene oxides into the corresponding aldehyde, for example, ethylene oxide, propylene oxide, $\alpha$-n-butylene oxide, isobutylene oxide, and the $\alpha$-amylene oxides.

The use of chlorine as a catalyst has been found to be very efficient and to provide a process that can be carried out at substantially lower temperatures than have heretofore usually been possible—in fact, at temperatures below the boiling point of the oxide, so that the process is conducted in the liquid phase. The alkylene oxide, as pointed out above, is converted by the process of the present invention into the desired product with the formation of little or no undesirable products, such as chlorine substitution products.

The treatment of the alkylene oxide with the catalyst is initiated at a temperature below the boiling point of the liquid alkylene oxide to be converted, and the temperature is maintained during the treatment below the boiling point of the liquid, that is to say, even in the case of an alkylene oxide of relatively low boiling point, the temperature during the process may be allowed to rise, for example, to about 30° C., as the boiling point of the liquid is increased due to the conversion of the oxide into the product comprising the para-aldehyde. It will be seen, therefore, that the conversion of the alkylene oxide is conducted in the liquid phase. In the case of the treatment of an alkylene oxide having a boiling point higher than 30° C., a temperature not exceeding about 30° C. is preferably employed, and the temperature during the treatment is advantageously not permitted to rise substantially beyond that point. In the now preferred embodiment of the process, particularly in the case of alkylene oxides of relatively low boiling point, the conversion will be initiated, and at least the major portion of the process will be carried out, at a temperature from about 0° C. to about 10° C., but it is to be understood that temperatures considerably lower than this range may be employed if desired. During the process, the liquid alkylene oxide is advantageously treated in equipment provided with a reflux condenser to prevent loss of the liquid.

The length of time of treatment will depend upon the temperature employed and the yield of product desired; in general, the longer the time of treatment, until substantial conversion has been obtained, the greater will be the yield. By controlling the temperature and time of reaction, it is possible to obtain substantially quantitative yields. The factors of time and temperature employed, in turn, determine to a large extent whether the para-aldehyde, or a mixture of the para-aldehyde and the monomeric aldehyde, will be obtained.

The catalyst is brought into contact with the alkylene oxide in the liquid phase in any desired manner. For example, the liquid may be saturated with a catalyst, and if the catalyst is evolved before completion of the process, the liquid may again be saturated. In the case the catalyst is in the gaseous phase, which is advantageously the case when chlorine is the catalyst, it may be bubbled or otherwise dispersed through the liquid alkylene oxide at a slow rate until the process is completed, and the gaseous catalyst which escapes may be collected and reused in the process. Since the chlorine employed serves merely as a catalyst, the amount employed is not important, so long as there is present an ample supply to cause the conversion.

At the completion of the process, the aldehyde obtained may be separated from any unconverted oxide by one of the conventional methods, such as distillation, extraction, and the like.

The following examples are illustrative of the process of the present invention and the advantages thereof will be apparent.

*Example I*

About 1 mol of pure ethylene oxide (44 gm.) was cooled to 0° C. to 2° C. and chlorine (about 5-6 gm.) was bubbled in over a period of 2.5 hours. The mixture was allowed to stand for about 16 hours, during the first 10 hours of which it was kept at 0° C. to 2° C. Much of the chlorine escaped and the temperature rose to about 25° C.-30° C. The liquid product was a mixture of acetaldehyde and para-acetaldehyde with only a very small amount of unreacted oxide. Only traces, if any, of other products were detected. Continuation of the process for an additional time increased the yield.

*Example II*

About 246 cc. of propylene oxide were cooled in an ice-water bath to about 0° to 2° C., while chlorine was dispersed into the mixture at the rate of less than 1 litre per hour for about 8 hours. After being freed from unreacted oxide, the product was found to be essentially para-propionaldehyde.

*Example III*

Chlorine (5-6 gm.) was dispersed into about 50 cc. of isobutylene oxide maintained at temperatures below 20° C. over a period of 2.5 hours. After removal of the excess chlorine, a straw colored liquid, remained. Tests for oxide and aldehyde were negative. A simple distillation of the product and subsequent identifications indicated that para-isobutyraldehyde was the essential product, no other substances being detected.

Experiments have shown that the alkylene oxide may be treated with the catalyst for a period greatly in excess of that required to obtain the aldehyde before any detectable substitution occurs. For example, saturation of ethylene oxide with chlorine in the temperature range of 0° C. to 5° C. gave the aldehyde reaction within seventeen hours, while it took about one hundred forty-four hours to obtain detectable substitution. Thus, ethylene oxide (or its converted products) may be treated in the presence of chlorine for as long as about six days during which the oxide has been converted to a mixture of acetaldehyde and para-acetaldehyde without obtaining detectable evolution of hydrogen chloride, an indication of substitution reactions. Of the oxide reacting under these conditions, that is up to six days, no products, other than acetaldehyde and para-aldehyde, were found. The same is true for the other alkylene oxides, for instance, propylene oxide may be treated up to about eight days in the temperature range of 0° C. to 5° C. with little or no substitution, in which time complete conversion of the oxide to the desired product has been induced.

Considerable modification is possible in the factors of temperature and time without departing from the essential features of the invention.

I claim:

1. The process of treating an $\alpha$-alkylene oxide of from 2 to 5 carbon atoms to convert it into a product comprising the para-aldehyde of a monomeric aldehyde isomer of said alkylene oxide which comprises bringing gaseous chlorine as a catalyst into contact with said alkylene oxide, in a liquid phase reaction, and maintaining contact between chlorine and said alkylene oxide to convert said oxide into said product.

2. The process of claim 1 wherein the temperature of the liquid phase reaction is not allowed to exceed about 30° C.

3. The process of claim 1 wherein the liquid phase reaction is initiated and at least the major portion thereof is conducted at a temperature from about 0° C. to about 10° C.

4. The process of treating ethylene oxide to convert it into a product comprising para-acetaldehyde which comprises bringing gaseous chlorine as a catalyst into contact with said ethylene oxide, in a liquid phase reaction, and maintaining contact between chlorine and said ethylene oxide to convert said oxide into said product.

5. The process of claim 4 wherein the liquid phase reaction is initiated and at least the major portion thereof is conducted at a temperature from about 0° C. to about 10° C.

6. The process of treating propylene oxide to convert it into a product comprising para-propionaldehyde which comprises bringing gaseous chlorine as a catalyst into contact with said propylene oxide, in a liquid phase reaction, and maintaining contact between chlorine and said propylene oxide to convert said oxide into said product.

7. The process of claim 6 wherein the liquid phase reaction is initiated and at least the major portion thereof is conducted at a temperature from about 0° C. to about 10° C.

8. The process of treating an $\alpha$-butylene oxide to convert it into a product comprising a para-butyraldehyde which comprises bringing gaseous chlorine as a catalyst into contact with said butylene oxide, in a liquid phase reaction, and maintaining contact between chlorine and said butylene oxide to convert said oxide into said product.

9. The process of claim 8 wherein the liquid phase reaction is initiated and at least the major portion thereof is conducted at a temperature from about 0° C. to about 10° C.

CHARLES I. PARRISH.

REFERENCES CITED

The following references are of record in the file of this patent:

UNITED STATES PATENTS

| Number | Name | Date |
| --- | --- | --- |
| 2,159,507 | Law et al. | May 23, 1939 |

FOREIGN PATENTS

| Number | Country | Date |
| --- | --- | --- |
| 331,185 | Great Britain | Mar. 18, 1929 |

OTHER REFERENCES

Beilstein, "Handbuch der Organischen Chemie," Vierte Auflage (1933), pages 4 and 5.

Ellis, Chemistry of Petroleum Derivatives, 1934, pages 546–7. (Copy in Division 6.)